(12) United States Patent
Sugiyama et al.

(10) Patent No.: US 6,462,866 B1
(45) Date of Patent: Oct. 8, 2002

(54) IMAGING OPTICAL SYSTEM AND ORIGINAL READING APPARATUS

(75) Inventors: Miho Sugiyama, Kawasaki; Kazuhiko Matsuoka, Yokohama; Kazuyuki Kondo, Kawasaki; Tadao Hayashide, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,287

(22) Filed: Feb. 18, 2000

(30) Foreign Application Priority Data

Feb. 19, 1999 (JP) .......................... 11-041154
Feb. 1, 2000 (JP) ........................ 2000-023865

(51) Int. Cl.$^7$ ............................................. F21V 9/04
(52) U.S. Cl. ..................... 359/359; 359/356; 359/357; 359/360
(58) Field of Search ................... 359/359, 355, 359/356, 357, 360

(56) References Cited

U.S. PATENT DOCUMENTS

| | | | | |
|---|---|---|---|---|
| 2,668,478 A | * | 2/1954 | Schroder ................... 359/359 |
| 4,991,030 A | | 2/1991 | Sato et al. ................... 358/474 |
| 5,177,605 A | * | 1/1993 | Takahashi et al. .......... 359/356 |
| 5,917,620 A | * | 6/1999 | Hasegawa et al. .......... 358/513 |
| 6,088,084 A | * | 7/2000 | Nishio .......................... 355/75 |
| 6,316,761 B1 | * | 11/2001 | Yamaguchi ............... 250/208.1 |
| 6,320,607 B1 | * | 11/2001 | Takasaki ...................... 348/64 |

* cited by examiner

Primary Examiner—Cassandra Spyrou
Assistant Examiner—Fayez Assaf
(74) Attorney, Agent, or Firm—Fitzpatrick, Cella, Harper & Scinto

(57) ABSTRACT

An image reading apparatus comprises a light source for illuminating an original, an imaging optical system for forming an image of the illuminated original on the focal plane of the system, and a sensor unit arranged in front of the focal plane. At least two infrared cut filters are arranged on the optical path between the light source and the sensor unit. Those infrared cut filters show respective spectral characteristics that are different from each other. The imaging optical system typically comprises a plurality of lenses and the infrared cut filters are arranged on at least two of the respective surfaces of the lenses.

8 Claims, 10 Drawing Sheets

IMAGING OPTICAL SYSTEM AND ORIGINAL READING APPARATUS

BACKGROUND OF THE INVENTION

1. Field of the Invention

This invention relates to an imaging optical system and an original reading apparatus. More particularly, it relates to an imaging optical system and an original reading apparatus comprising an infrared cut filter arranged in the optical path thereof.

2. Related Background Art

FIG. 1 of the accompanying drawings is a schematic cross sectional view of a known image reading apparatus taken along the main scanning direction thereof. Such an image reading apparatus is typically used for a film scanner.

Referring to FIG. 1, the object to be read (original image) that is a transparency type original (film) 101 is irradiated with a light beam emitted from a fluorescent lamp 102 operating as light source. Then, an image of the illuminated original 101 is formed on a sensor unit 104 by means of an imaging optical system 103 with a predetermined magnification. The sensor unit 104 detects the light beam from the original 101 and outputs an analog signal (analog information) 106. The analog signal is amplified by an operational amplifier (not shown) and input to an A/D converter 105. The A/D converter 105 converts the input analog signal into a digital signal (digital information). The relative position of the original 101 and the sensor unit 104 is shifted by a drive means (not shown). For example, image data may be read from the original 101 by driving the original 101 in the sub-scanning direction that is perpendicular to the main scanning direction of the imaging optical system.

A so-called monolithic 3-line sensor unit comprising three line sensors arranged on a same substrate is typically used for the sensor unit 104. Each of the line sensors is formed by linearly arranging a plurality of photoelectric conversion elements (light receiving pixels) along the main scanning direction. Charge coupled devices (CCDs) are typically used for such line sensors. Filters of three colors of red (R), green (G) and blue (B) are arranged respectively on the three line sensors so that the original 101 may be read in color.

FIG. 2 of the accompanying drawings is a graph showing the spectral sensitivity characteristics of the three line sensors of a monolithic 3-line sensor unit used as sensor unit 104 in the original reading apparatus and the emission spectrum of the fluorescent lamp. Note that the curves are drawn by using a relative scale. In FIG. 2, the horizontal axis shows the wavelength of light while the vertical axis indicates an arbitrarily selected relative scale. The dotted curve 111 indicates the emission spectrum of the fluorescent lamp. The solid curves 112-R, 112-G and 112-B in FIG. 2 indicate spectral sensitivity distribution patterns of the line sensors equipped respectively with color filters of red (R), green (G) and blue (B) filters.

Generally, fluorescent lamps contains mercury and xenon in the inside of the tube because the light emitting mechanism of the tube requires the use of such substances. Then, a fluorescent lamp shows an emission spectrum extending over the wavelength range of not only visible light (between 400 nm and 700 nm) but also infrared rays (700 nm and more). On the other hand, the spectral sensitivity distribution patterns of the line sensors as indicated by the curves 112-R, 112-G and 112-B are determined basically by the spectral sensitivity distribution characteristics of the silicon used in the photoelectric conversion elements and the transmission spectral distribution characteristics of the color filters arranged on the respective line sensors. Thus, the spectral sensitivity distribution characteristics of the three line sensors do not show any significant difference in the wavelength range of infrared rays as seen from the curves 112-R, 112-G and 112-B. This means that a substantially same signal is output from each of the three line sensors for the wavelength range of infrared rays regardless of the information on the color image of the original 101. In other words, signals for the infrared wavelength range is laid on the respective color signals detected for the three color sensors to narrow the dynamic range for reading the color image.

With conventional techniques, this drawback is eliminated and adversely affecting infrared rays are removed by means of an infrared cut filter 107 that is a multilayer film 107 formed on one of the surfaces of a lens of the imaging optical system, for example the light receiving surface 103A of the imaging optical system 103 shown in FIG. 1.

FIG. 3 of the accompanying drawings is a graph showing the spectral characteristics of such a conventional infrared cut filter. In FIG. 3, the horizontal axis indicates the wavelength of light while vertical axis shows the transmittivity of light of the filter. The substrate of the infrared cut filter is made of glass and has a refractive index of 1.52. In FIG. 3, the curve 121 shows the spectral characteristics (equivalent characteristics) of an infrared cut filter prepared by alternately forming a total of twelve layers of high refractive index dielectric layers typically of $TiO_2$ and low refractive index dielectric layers typically of $SiO_2$ or $MgF_2$ on a glass substrate by evaporation. Each of the dielectric layers of this infrared cut filter has a thickness of 225 nm, except the uppermost twelfth layer that is made to have a thickness of 105 nm in order to suppress the ringing effect of the spectral characteristics. Note that the plotted values are those relative to rays of light striking the substrate perpendicularly.

The curve 122 in FIG. 3, on the other hand, shows the spectral characteristics of an infrared cut filter prepared by alternately forming a total of twenty-four layers of high refractive index dielectric layers typically made of $TiO_2$ and low refractive index dielectric layers typically made of $SiO_2$ or $MgF_2$ on a glass substrate by evaporation. Each of the dielectric layers of this infrared cut filter has a layer thickness of 225 nm, except the uppermost twenty-fourth layer that is made to have a thickness of 105 nm in order to suppress the ringing effect of spectral characteristics.

It will be appreciated from FIG. 3 that the infrared cut filter indicated by the curve 121 and comprising twelve layers shows a transmittivity of higher than 1% at and near the wavelength of 900 nm where the filter is least transmissive to prove a relative poor performance of the filter. For the convenience of explanation, the wavelength zone where the transmittivity of a filter is less than 10% is referred to as effective infrared cut zone of the filter. Then, the effective infrared cut zone of the infrared cut filter having twelve film layers is found between 810 nm and 1,030 nm, which is narrow and not satisfactory for practical applications. Particularly, the infrared cut filter of the curve 121 is ineffective for cutting near infrared rays that are close to rays of visible light.

On the other hand, the infrared cut filter indicated by the curve 122 in FIG. 3 and comprising twenty-four layers shows a transmittivity of about 0.1% at and near the wavelength of 900 nm where the filter is least transmissive to prove a satisfactory performance of the filter. However, the effective infrared cut zone of the filter is found between 790 nm and 1,040 nm, which is also narrow and not satisfactory for practical applications. Additionally, the large number of dielectric layers of this filter may constitute a manufacturing problem. Still additionally, an infrared cut filter having such a large number of layers may be liable to show peeled layers with time particularly under adverse environmental conditions in terms of temperature and humidity.

SUMMARY OF THE INVENTION

In view of the above identified problems of the prior art, it is therefore the first object of the present invention to provide an imaging optical system having a simple configuration that can effectively and satisfactorily remove infrared rays over a wide wavelength zone.

The second object of the present invention is to provide an image reading apparatus that is free from the above identified problems of the prior art and can read an image with a wide dynamic range by effectively and satisfactorily removing infrared rays.

According to the invention, the above first object is achieved by providing an imaging optical system comprising:

a plurality of lenses; and infrared cut filters arranged on at least two of the respective surfaces of the plurality of lenses, said infrared cut filters showing respective spectral characteristics that are different from each other.

According to the invention, the above second object is achieved by providing an image reading apparatus comprising:

a light source for illuminating an original image;

an imaging optical system for forming an image of the illuminated original image on the focal plane of the system;

a sensor unit arranged in front of said focal plane; and at least two infrared cut filters arranged on the optical path between the light source and the sensor unit, said infrared cut filters showing respective spectral characteristics that are different from each other.

According to the invention, there is also provided an image reading apparatus comprising:

a light source for illuminating an original image;

an imaging optical system for forming an image of the illuminated original image on the focal plane of the system;

a sensor unit arranged in front of said focal plane;

an A/D converter for converting the output signal of said sensor unit into an n-bit digital signal; and an infrared cut filter unit arranged on the optical path between the light source and the sensor unit, said infrared cut filter having a wavelength zone satisfying the relationship as expressed by the formula below:

$$T \leq 100/\{2^{**(n-1)}\},$$

where T is the transmittivity of said infrared cut filter and ** is the power exponent.

DESCRIPTION OF THE PREFERRED EMBODIMENTS

Embodiment 1

Figure 1:
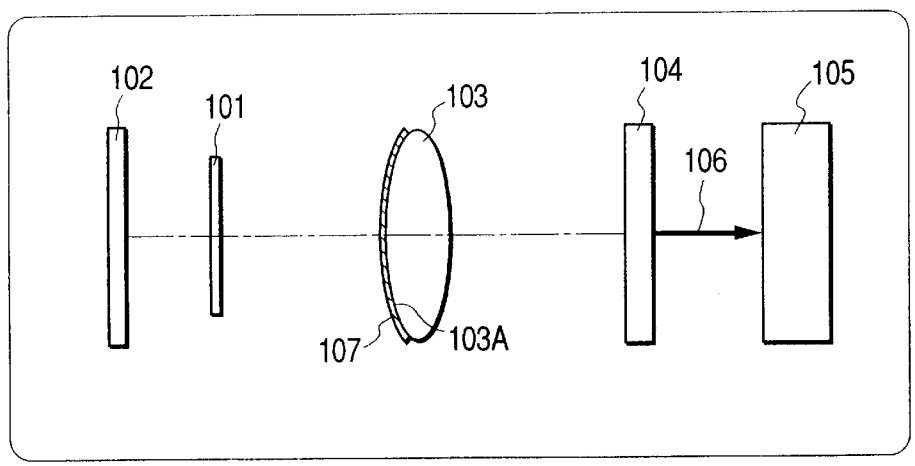
FIG. 1 is a schematic cross sectional view of a known image reading apparatus taken along the main scanning direction thereof.
Figure 2:
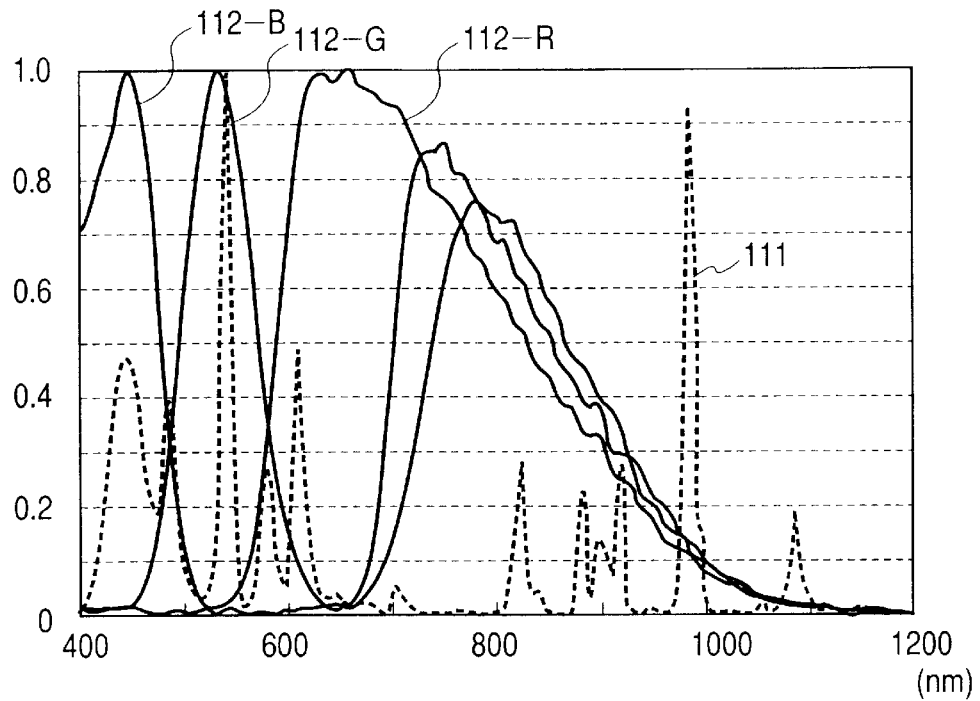
FIG. 2 is a graph showing the emission spectrum of the fluorescent lamp and the spectral sensitivity distribution characteristics of the line sensors of a known image reading apparatus.
Figure 3:
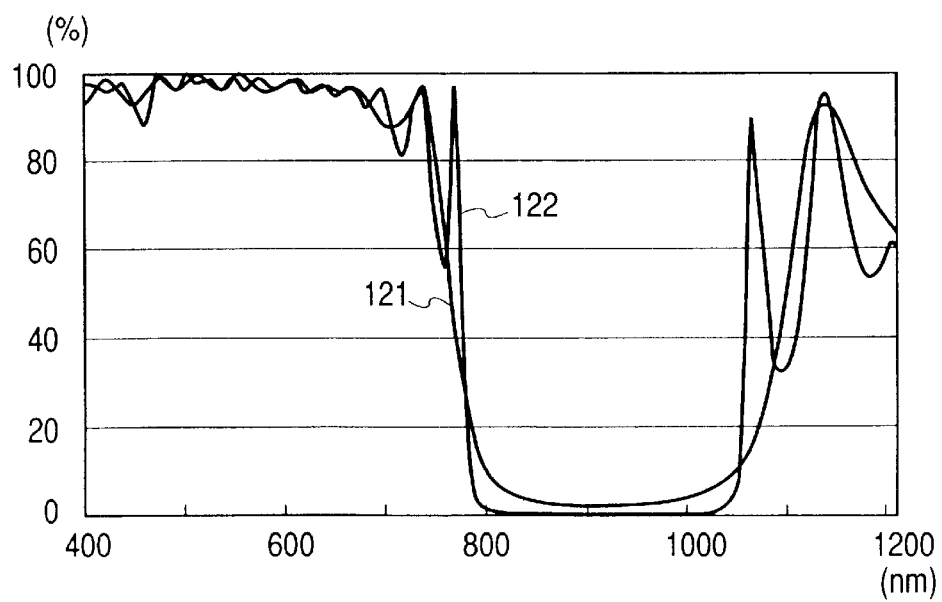
FIG. 3 is a graph showing the spectral characteristics of known infrared cut filters.
Figure 4:
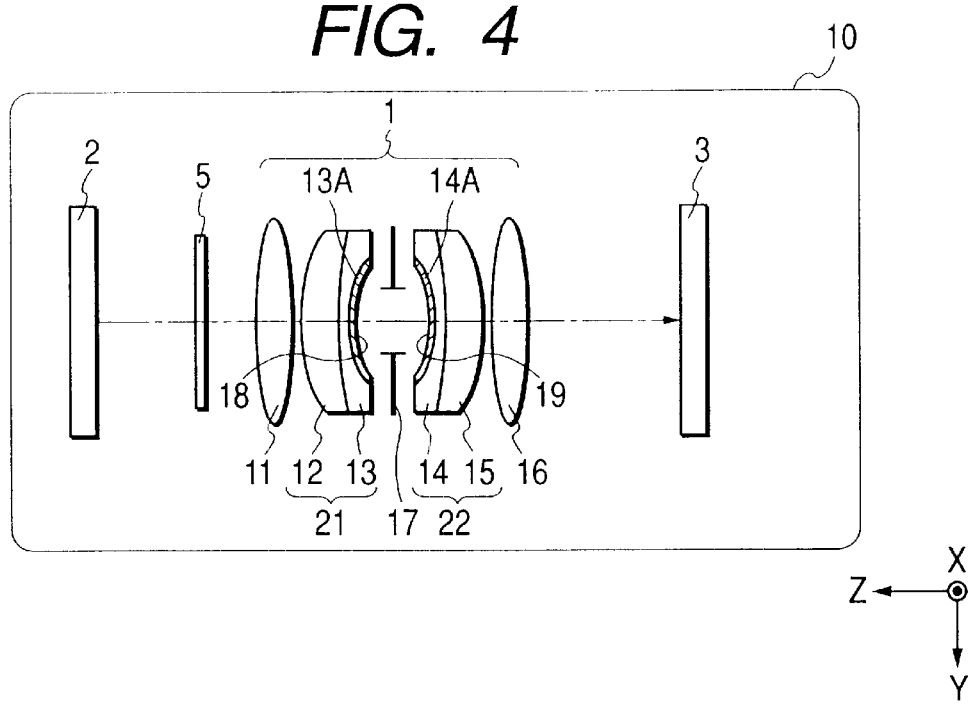
FIG. 4 is a schematic cross sectional view of a principal portion of the first embodiment of image reading apparatus according to the invention taken along the main scanning direction thereof.

FIG. 4 is a schematic cross sectional view of the first embodiment of image reading apparatus according to the invention taken along the main scanning direction thereof. Such an image reading apparatus is typically used for a film scanner. In FIG. 4, the main scanning direction of the embodiment is running in parallel with the Y-axis while the sub-scanning direction thereof is running in parallel with the X-axis.

Referring to FIG. 4, reference numeral 10 denotes the image reading apparatus. Original (transparent film) 5 that is the object to be read (original image) by the image reading apparatus is irradiated with a light beam coming from fluorescent lamp 2 that is the light source of the apparatus. An image of the illuminated original 5 is formed on monolithic 3-line sensor unit 3 with a predetermined magnification by means of imaging optical system 1. The relative positions of the original 5 and the sensor unit 3 can be modified by a drive means (not shown). Thus, image information may be collected from the original 5 by shifting the original 5 along the sub-scanning direction of the apparatus that is running in parallel with the X-axis.

Figure 5:
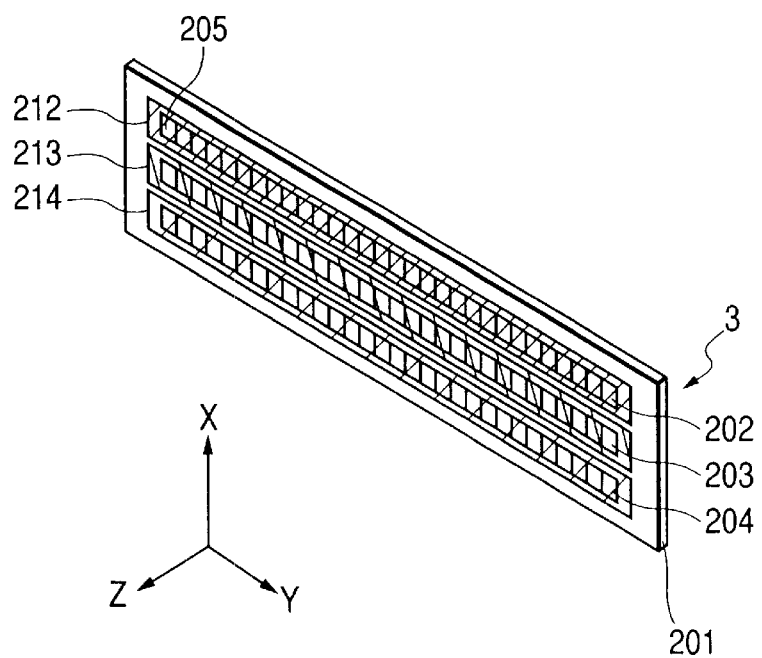
FIG. 5 is a schematic perspective view of the monolithic 3-line sensor unit of the first embodiment, illustrating its configuration.

FIG. 5 is a schematic perspective view of the monolithic 3-line sensor unit 3 of FIG. 4. The sensor unit 3 comprises three line sensors 202, 203 and 204 formed on a substrate 201. In each of the line sensors, a plurality of photoelectric conversion elements (light receiving pixels) 205 are arranged linearly along the main scanning direction that is parallel to the Y-axis. A charge coupled device (CCD) is typically used for such a line sensor. A red (R) pass filter 212, a green (G) pass filter 213 and a blue (B) pass filter 214 are arranged respectively on the line sensors 202, 203 and 204. Thus, color image information can be collected from the original 5 by means of the output signals of the line sensors.

The imaging optical system 1 of FIG. 4 comprises a positive first lens 11, a first cemented lens 21, an aperture 17, a second cemented lens 22 and a positive sixth lens 16 that are arranged in the above described order as viewed from the original. The first cemented lens 21 includes a positive second lens 12 and a negative third lens 13 that are bonded together, whereas the second cemented lens 22 includes a negative fourth lens 14 and a positive fifth lens 15 that are bonded together. Hence, the imaging optical system 1 comprises six lenses that are divided into four groups.

A first infrared cut filter 18 is arranged on the lens surface 13A of the negative third lens 13 located close to the sensor unit 3. On the other hand, a second infrared cut filter 19 is arranged on the surface 14A of the negative fourth lens 14 located close to the original 5. The configurations of the infrared cut filters will be discussed below.

Figure 6:
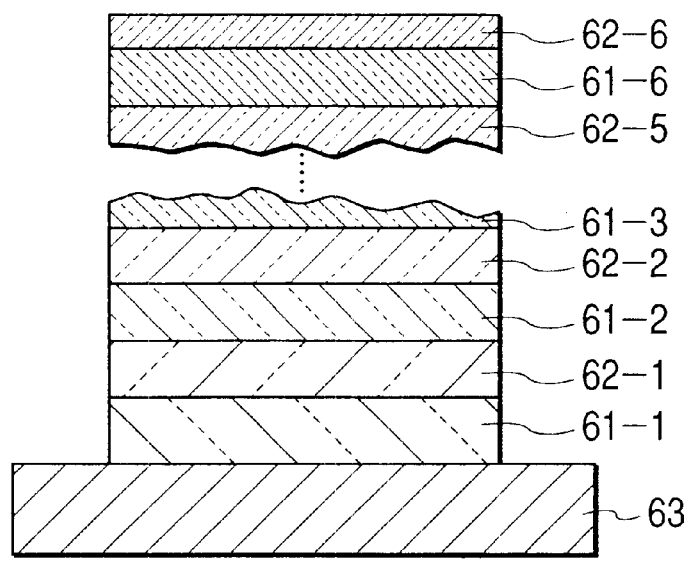
FIG. 6 is a schematic cross sectional view of the first infrared cut filter of the first embodiment.

FIG. 6 is a schematic cross sectional view of the first infrared cut filter 18 of FIG. 4, schematically illustrating its configuration. Reference numeral 63 in FIG. 6 denotes a glass substrate showing an refractive index of 1.52 and corresponding to the lens 13 in FIG. 4. A total of six high refractive index dielectric layers 61-1, 61-2, 61-3, . . . , and 61-6 typically made of $TiO_2$ and a total of six low refractive index dielectric layers 62-1, 62-2, 62-3, . . . , and 62-6 typically made of $SiO_2$ or $MgF_2$ are laid alternately on the glass substrate 63. Note that several intermediary dielectric layers are omitted in FIG. 6. The dielectric layers are typically formed on the glass substrate 63 by evaporation. All the six high refractive index dielectric layers 61-1 through 61-6 and the five low refractive index dielectric layers 62-1 through 62-5 have a film thickness of 200 nm. The uppermost low refractive index layer 62-6 is made to have a film thickness of 100 nm in order to suppress the ringing effect of spectral characteristics.

Figure 7:
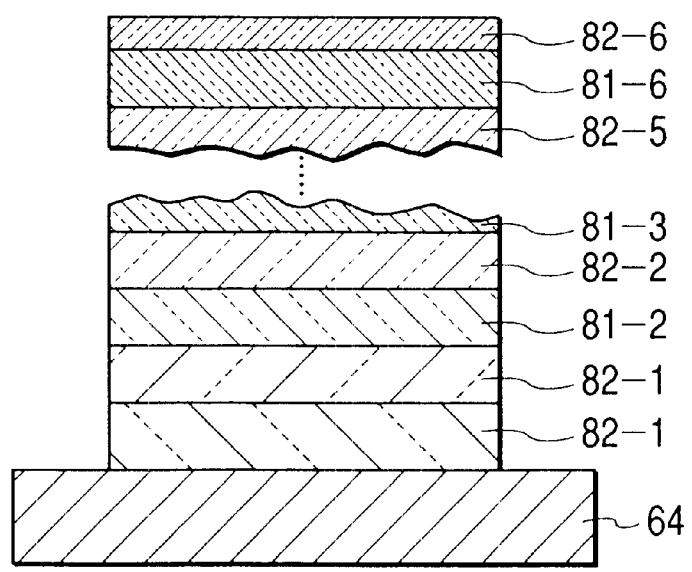
FIG. 7 is a schematic cross sectional view of the second infrared cut filter of the first embodiment.

FIG. 7 is a schematic cross sectional view of the second infrared cut filter 19 of FIG. 4, schematically illustrating its configuration. Reference numeral 64 in FIG. 7 denotes a glass substrate showing an refractive index of 1.52 and corresponding to the lens 14 in FIG. 4. A total of six high refractive index dielectric layers 81-1, 81-2, 81-3, . . . , and 81-6 typically made of $TiO_2$ and a total of six low refractive index dielectric layers 82-1, 82-2, 82-3, . . . , and 82-6 typically made of $SiO_2$ or $MgF_2$ are laid alternately on the glass substrate 64. Note that several intermediary dielectric layers are omitted in FIG. 7. The dielectric layers are typically formed on the glass substrate 64 by evaporation. All the six high refractive index dielectric layers 81-1 through 81-6 and the five low refractive index dielectric layers 82-1 through 81-5 have a film thickness of 250 nm. The uppermost low refractive index layer 82-6 is made to have a film thickness of 110 nm in order to suppress the ringing effect of spectral characteristics.

Thus, both the first infrared cut filter 18 and the second infrared cut filter 19 comprise dielectric layers that are made of similar materials and arranged in a similar way. Only the thicknesses of the component dielectric layers are different between the two filters. However, the first and second infrared cut filters 18 and 19 show different spectral characteristics because of the difference of film thickness.

Figure 8:
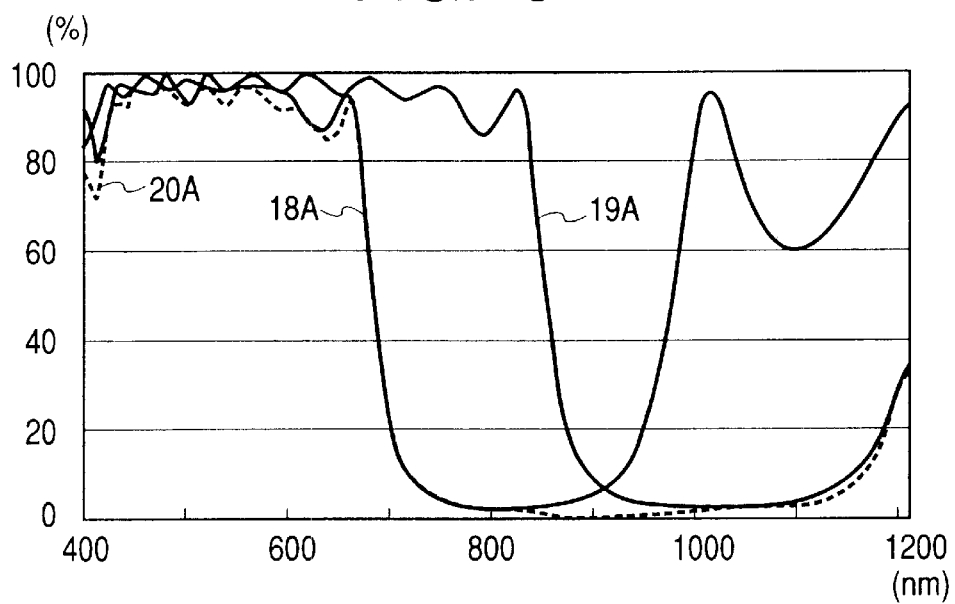
FIG. 8 is a graph showing the spectral characteristics of the infrared cut filters of the first embodiment.

FIG. 8 is a graph illustrating the spectral characteristics of the two infrared cut filters. In FIG. 8, the horizontal axis represents the wavelength and the vertical axis represents the transmittivity. Referring to FIG. 8, the curve 18A represents the spectral characteristics of the first infrared cut filter 18, whereas the curve 19A represents the spectral characteristics of the second infrared cut filter 19. The curve 20A represents the combined spectral characteristics obtained as combined effect of the first and second infrared cut filters 18 and 19.

As the curve 20A shows, as a result of combining the first and second infrared cut filters 18 and 19 in this embodiment, a satisfactorily low transmittivity of 0.3% can be achieved for the wavelength of 900 nm. A wavelength zone between 710 nm and 1,160 nm shows a low transmittivity level of lower than 10% and is by far broader than its counterpart of the above described prior art. Thus, the influence of infrared rays can be satisfactorily suppressed within that zone. Additionally, each of the first and second infrared cut filters 18 and 19 comprises twelve dielectric layers so that it can be manufactured in a simple manner and is less liable to show peeled layers with time if compared with the conventional infrared cut filter having twenty-four layers.

In this embodiment, the infrared cut filters are arranged on the lens surfaces that are located close to the aperture 17. The principal rays and the marginal rays striking the dielectric multilayer structures show only a little difference if the filters are arranged on such lens surfaces. Thus, this embodiment provides an advantage that the performance of incident light is less affected by the angle of incidence.

Embodiment 2

Figure 9:
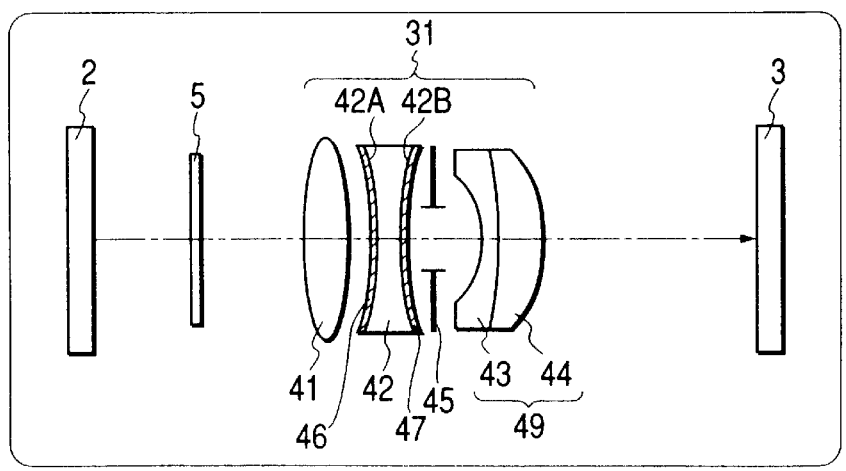
FIG. 9 is a schematic cross sectional view of a principal portion of the second embodiment of image reading apparatus according to the invention taken along the main scanning direction thereof.

FIG. 9 is a schematic cross sectional view of a principal portion of the second embodiment of image reading apparatus according to the invention taken along the main scanning direction thereof as it is applied to a film scanner. In FIG. 9, the components same as those of FIG. 4 are denoted respectively by the same reference symbols and would not be described any further.

In FIG. 9, reference numeral 40 denotes the image reading apparatus, which differs from the first embodiment in that the imaging optical system 1 of FIG. 4 is replaced by imaging optical system 31. Otherwise, the second embodiment has a configuration same as the first embodiment.

The imaging optical system 31 comprises a positive first lens 41, a negative second lens 42, an aperture 45 and a cemented lens 49 that are arranged in the above described order as viewed from the original. The cemented lens 49 includes a negative third lens 43 and a positive fourth lens 44 that are bonded together. In other words, the imaging optical system 31 comprises four lenses that are divided into three groups.

The first infrared cut filter 46 is arranged on the lens surface 42A of the negative second lens 42 located close to the original 5. On the other hand, the second infrared cut filter 47 is arranged on the other surface 42B of the same negative second lens 42 that is located close to the sensor unit 3. The first and second infrared cut filters 46 and 47 show different spectral characteristics.

The first infrared cut filter 46 has a configuration same as the first infrared cut filter of the first embodiment described above by referring to FIG. 6. On the other hand, the second infrared cut filter 47 is formed by alternately evaporating a total of six high refractive index dielectric layers and a total of six low refractive index dielectric layers on a glass substrate showing a refractive index of 1.52 as described above by referring to FIG. 7. However, the uppermost low refractive index dielectric layer has a thickness of 105 nm, whereas all the remaining dielectric layers have a thickness of 225 nm.

Figure 10:
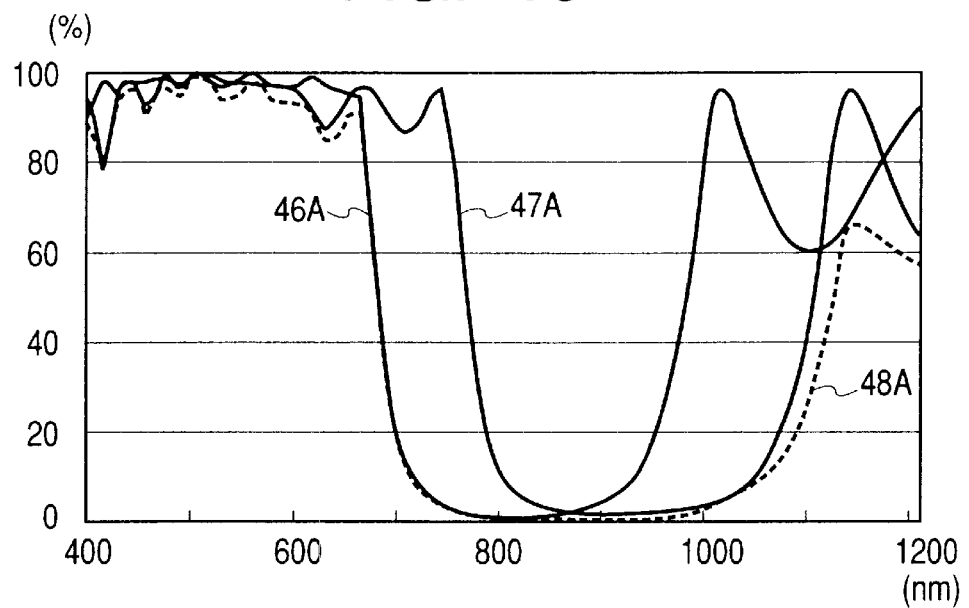
FIG. 10 is a graph showing the spectral characteristics of the infrared cut filters of the second embodiment.

FIG. 10 is a graph illustrating the spectral characteristics of the two infrared cut filters of the second embodiment. In FIG. 10, the horizontal axis represents the wavelength and the vertical axis represents the transmittivity. Referring to FIG. 10, the curve 46A represents the spectral characteristics of the first infrared cut filter 46, whereas the curve 47A represents the spectral characteristics of the second infrared cut filter 47. As described above, since the first infrared cut filter 46 has a configuration same as the first infrared cut filter 18 of the first embodiment, the curve 46A showing its spectral characteristics is same as the curve 18A in FIG. 8. The curve 48A represents the combined spectral characteristics obtained as combined effect of the first and second infrared cut filters 46 and 47.

As the curve 48A shown in FIG. 10, as a result of combining the first and second infrared cut filters 46 and 47 in this embodiment, a satisfactorily low transmittivity of 0.1% can be achieved for the wavelength of 900 nm. Also, a satisfactorily low transmittivity of 0.06% can be achieved for the wavelength of 860 nm. A wavelength zone between 710 nm and 1,050 nm shows a low transmittivity level of lower than 10% and is by far broader than its counterpart of the above described prior art. Thus, the influence of infrared rays can be satisfactorily suppressed within that zone.

The conditions including the degree of vacuum under which infrared cut filters are prepared by evaporation may vary from one to another depending on materials to be evaporated. Therefore, when at least two infrared cut filters are used in an apparatus, it is preferable to use same materials for the dielectric layers of those filters to minimize the required number of evaporation systems and hence simplify the overall manufacturing process. On the other hand, the spectral characteristics of an infrared cut filter comprising a plurality of dielectric layers depend partly on the refractive index of the glass (lens) of the substrate. Thus, the dielectric layers can be designed in a simple manner in this embodiment where the two infrared cut filters are arranged on the opposite surfaces of a same lens if a same combination of dielectric materials are used for the two infrared cut filters.

Embodiment 3

Now, the third embodiment of the invention will be described. This third embodiment differs from the second embodiment described above by referring to FIG. 9 in that the first and second infrared cut filters 46 and 47 of the second embodiment are replaced by other infrared cut filters showing different characteristics. The third embodiment has a configuration same as the second embodiment except the infrared cut filters.

In this embodiment, the first infrared cut filter is also arranged on the surface 42A of the negative second lens 42 and prepared by alternately forming a total of six high refractive index dielectric layers and a total of six low refractive index dielectric layers on a glass substrate showing a refractive index of 1.52 as described above by referring to FIG. 6. However, the uppermost low refractive index dielectric layer has a thickness of 105 nm, whereas all the remaining dielectric layers have a thickness of 225 nm. In other words, the first infrared cut filter of this embodiment is identical with the second infrared cut filter of the second embodiment. The high refractive index dielectric layers are typically made of $TiO_2$, while the low refractive index dielectric layers are typically made of $SiO_2$ or $MgF_2$.

The second infrared cut filter arranged on the surface 42B of the negative second lens 42 has a configuration same as the infrared cut filter described above by referring to FIG. 7. In other words, the second infrared cut filter of this embodiment has a configuration same as the second infrared cut filter of the first embodiment.

Figure 11:
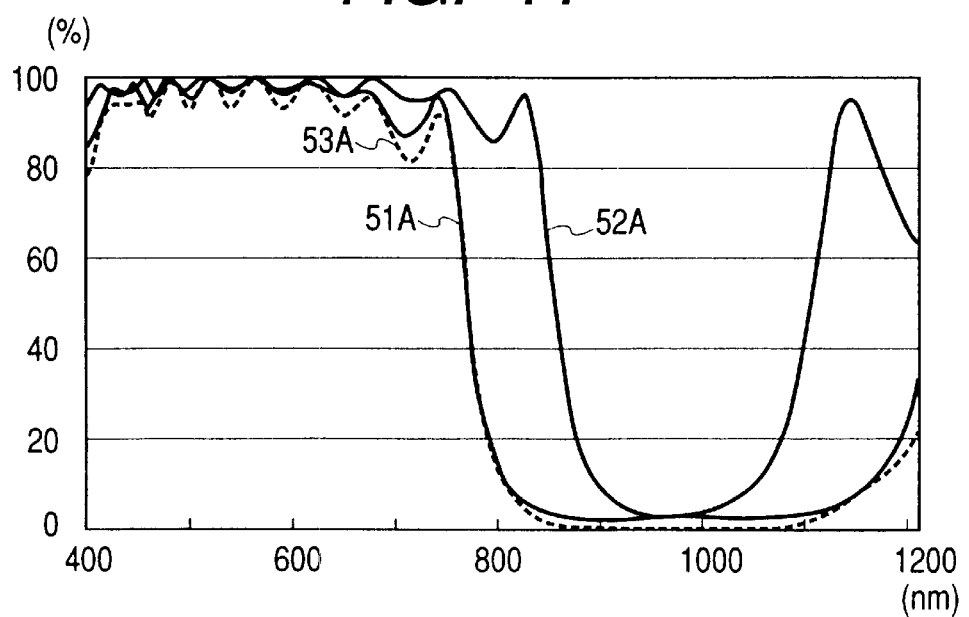
FIG. 11 is a graph showing the spectral characteristics the infrared cut filters of the third embodiment of the image reading apparatus according to the invention.

FIG. 11 is a graph illustrating the spectral characteristics of the two infrared cut filters of the third embodiment. In FIG. 11, the horizontal axis represents the wavelength and the vertical axis represents the transmittivity. Referring to FIG. 11, the curve 51A represents the spectral characteristics of the first infrared cut filter 46 arranged on the surface 42A of the negative second lens 42 of FIG. 9, whereas the curve 52A represents the spectral characteristics of the second infrared cut filter 47 arranged on the other surface 42B of the same negative second lens 42 of FIG. 9. As described above, since the first infrared cut filter of this embodiment has a configuration same as the second infrared cut filter 18 of the second embodiment, the curve 51A showing its spectral characteristics is same as the curve 47A in FIG. 10. On the other hand, since the second infrared cut filter of this embodiment has a configuration same as the second infrared cut filter 19 of the first embodiment, the curve 52A showing its spectral characteristics is same as the curve 19A in FIG. 8. The curve 53A represents the combined spectral characteristics obtained as combined effect of the first and second infrared cut filters of the third embodiment.

As the curve 53A shown in FIG. 11, as a result of combining the first and second infrared cut filters of the third embodiment, satisfactorily low transmittivities of 0.1% and 0.06% can be achieved for the wavelengths of 900 nm and 860 nm. A wavelength zone between 800 nm and 1,160 nm shows a low transmittivity level of lower than 10% and is by far broader than its counterpart of the above described prior art. Thus, the influence of infrared rays can be satisfactorily suppressed within that zone.

Embodiment 4

Figure 12:
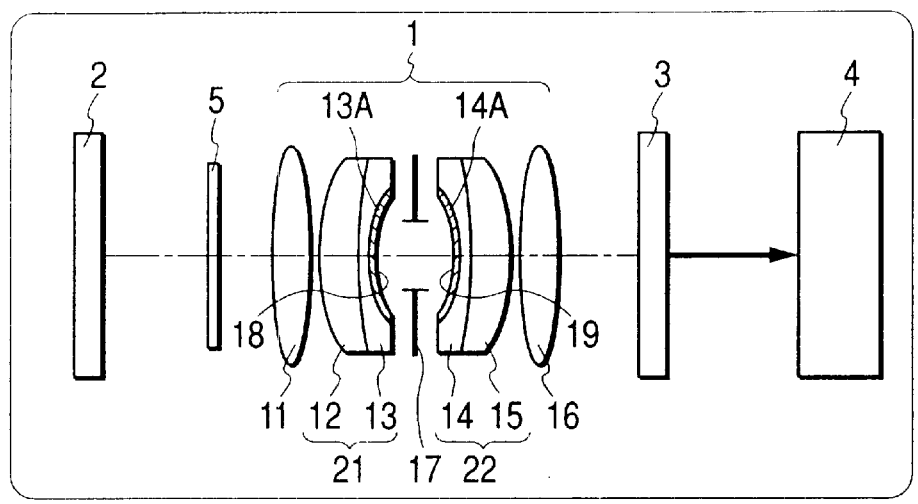
FIG. 12 is a schematic cross sectional view of a principal portion of the fourth embodiment of image reading apparatus according to the invention taken along the main scanning direction thereof.

FIG. 12 is a schematic cross sectional view of a principal portion of the fourth embodiment of image reading apparatus according to the invention taken along the main scanning direction thereof. Such an image reading apparatus may typically be used for a film scanner. In FIG. 12, the components same as those of FIG. 4 are denoted respectively by the same reference symbols and would not be described any further.

Referring to FIG. 12, the analog signal output from the sensor unit 3 and amplified by an operational amplifier (not shown) is input to A/D converter 4. The A/D converter 4 transforms the input analog signal into a digital signal (digital information). Then, the relative positions of the original and the sensor unit 3 are modified by a drive means (not shown). Thus, image information may be collected from the original 5 by shifting the original 5 along the sub-scanning direction of the apparatus that is running perpendicular to the main scanning direction.

This embodiment of original reading apparatus comprising the A/D converter 4 differs from the first embodiment in that the number of bits n of the A/D converter 4 is selected by taking the spectral characteristics of the infrared cut filters in the infrared zone (the combined spectral characteristics of the first and second infrared cut filters 18 and 19) into consideration. For instance, if the number of bits n of the A/D converter 4 is n=8, the digital output signal of the A/D converter 4 represents a total of 256 tones or 28 (where  represents the power exponent). If, on the other hand, the number of bits n of the A/D converter is n=10, the digital output signal of the A/D converter 4 represents a total of 1,024 tones. The infrared cut filters show a transmittivity of almost 100% in the wavelength zone of visible light. When it is represented by 2**n tones, the transmittivity of the embodiment for infrared rays that can exert adverse effects preferably corresponds to less than one tone. More specifically, the transmittivity T of the infrared cut filters of this embodiment in the infrared wavelength zone should be so selected as to have satisfy the requirement defined by formula (1) below.

$$T \leq 100(2^{**}n) \quad (1)$$

The infrared wavelength zone of the infrared cut filters is a range between 710 nm and 1,160 nm.

If an A/D converter with a number of bits n of n=8 is used, the transmittivity of the infrared cut filters is (100/256)%, or about 0.4%, for infrared rays. If, on the other hand, an A/D converter with a number of bits n of n=10, the transmittivity of the infrared cut filters is (100/1,024)%, or about 0.1%, for infrared rays. Thus, the influence of infrared rays can be reduced to an almost perfectly negligible level from the output of the A/D converter by selecting an appropriate value that meets the requirement of formula (1) above for the transmittivity T of the infrared cut filters in the infrared wavelength zone.

In actual original reading apparatus, the noise component generated by the CCDs and other elements in the electronic circuit will be added to the analog output of the CCDs. Generally, the influence of infrared rays that is equivalent to that of the noise component of the output signal is admissible. Thus, in view of the fact that a noise component of about one bit is generally admitted, the transmittivity T of the infrared cut filters may well be so selected for the infrared wavelength zone as to satisfy the requirement expressed by formula (2) below.

$$T \leq 100/\{2^{**}(n-1)\} \quad (2)$$

Thus, if an A/D converter with a number of bits n of n=8 is used, the transmittivity of the infrared cut filters is (100/128)%, or about 0.8%, for infrared rays. If, on the other hand, an A/D converter with a number of bits n of n=10, the transmittivity of the infrared cut filters is (100/512)%, or about 0.2%, for infrared rays. Thus, the influence of infrared rays can be reduced to a practically negligible level from the output of the A/D converter 4 by selecting an appropriate value that meets the requirement of formula (2) above for the transmittivity T of the infrared cut filters in the infrared wavelength zone.

Thus, it will be appreciated that an original reading apparatus can be manufactured easily at low cost without employing infrared cut filters that are prepared too elaborately only by meeting the requirement of formula (1) or (2) above as in the case of this embodiment.

While two infrared cut filters showing different spectral characteristics are used in this embodiment, they may be replaced by a single infrared cut filter if it meets the requirement of formula (1) or (2) above.

Embodiment 5

Figure 13:
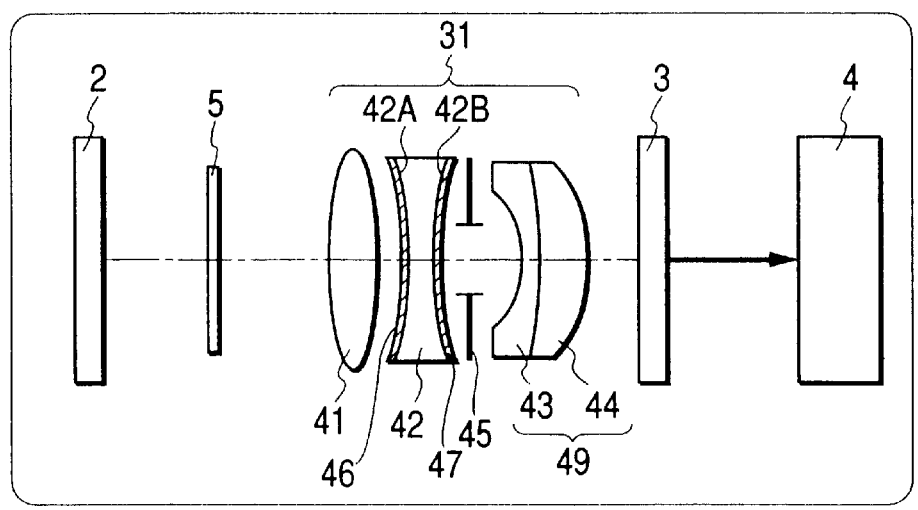
FIG. 13 is a schematic cross sectional view of a principal portion of the fifth embodiment of image reading apparatus according to the invention taken along the main scanning direction thereof.

FIG. 13 is a schematic cross sectional view of a principal portion of the fifth embodiment of image reading apparatus according to the invention taken along the main scanning direction thereof. Such an image reading apparatus may typically be used for a film scanner. In FIG. 13, the components same as those of FIGS. 9 and 12 are denoted respectively by the same reference symbols and would not be described any further.

This embodiment differs from the above described fourth embodiment in that the first and second infrared cut filters 46 and 47 showing different spectral characteristics are formed by evaporation respectively on the opposite surfaces 42A and 42B of the second lens 42 of the imaging optical system 31 comprising a total of four lenses that are divided into three groups. Otherwise, this embodiment is similar to the fourth embodiment in terms of configuration and optical effects so that it operates substantially same as the fourth embodiment.

More specifically, in this embodiment, the first and second infrared cut filters 46 and 47 of this embodiment are formed by evaporation respectively on the opposite surfaces 42A and 42B of the second lens 42 and the transmittivity T of the infrared cut filters is so selected as to satisfy the requirement of formula (1) or (2) in the infrared wavelength zone as in the case of the fourth embodiment. Thus, this embodiment operates substantially same as the fourth embodiment.

Embodiment 6

Figure 14:
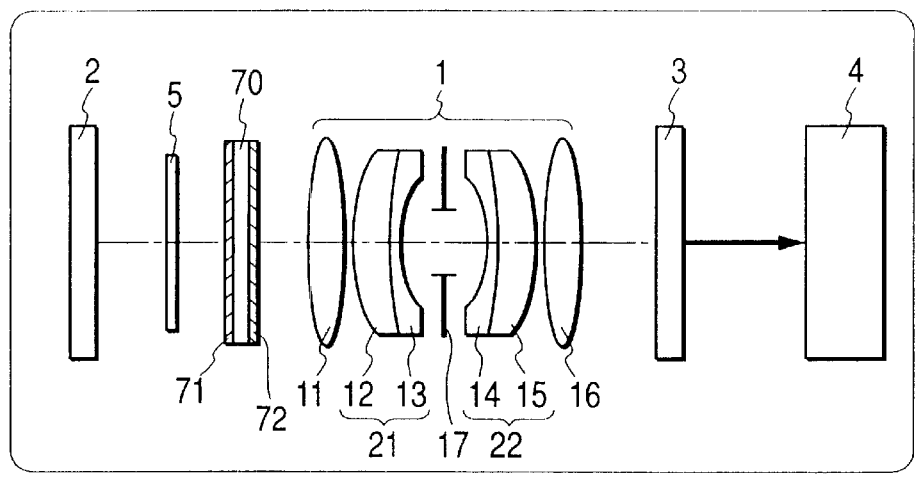
FIG. 14 is a schematic cross sectional view of a principal portion of the sixth embodiment of image reading apparatus according to the invention taken along the main scanning direction thereof.

FIG. 14 is a schematic cross sectional view of a principal portion of the sixth embodiment of image reading apparatus according to the invention taken along the main scanning direction thereof. Such an image reading apparatus may typically be used for a film scanner. In FIG. 14, the components same as those of FIG. 12 are denoted respectively by the same reference symbols and would not be described any further.

This embodiment differs from the above described fourth embodiment in that the infrared cut filters of the fourth embodiment formed respectively on the surface 13A of the lens 13 and the surface 14A of the lens 14 are replaced by the first and second infrared cut filters 71 and 72 showing different spectral characteristics and formed by evaporation respectively on the opposite parallel surfaces of a flat glass panel 70 that is arranged on the optical path between the original 5 and the imaging optical system 1. Otherwise, this embodiment is similar to the fourth embodiment in terms of configuration and optical effects so that it operates substantially same as the fourth embodiment.

Figure 16:
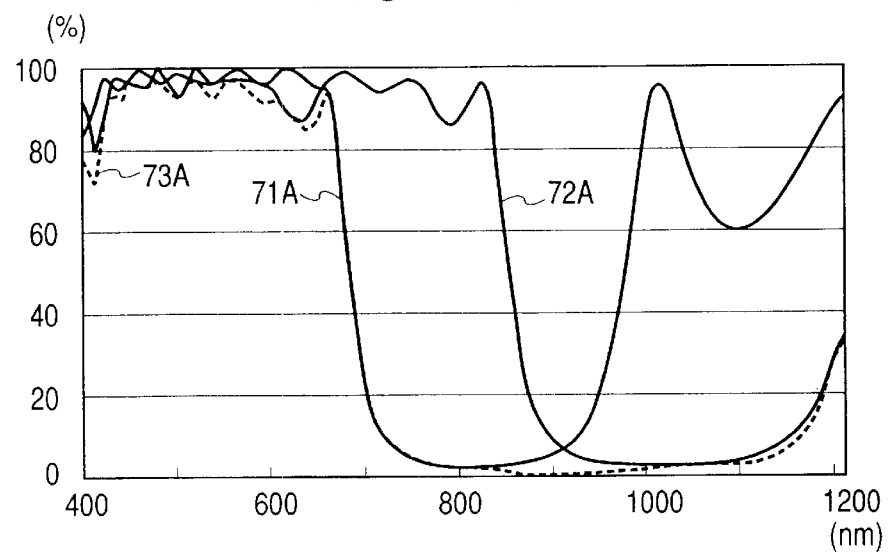
FIG. 16 is a graph showing the spectral characteristics of the infrared cut filters of the sixth and seventh embodiments.

FIG. 16 is a graph illustrating the spectral characteristics of the two infrared cut filters of the sixth embodiment. In FIG. 16, the horizontal axis represents the wavelength and the vertical axis represents the transmittivity. Referring to FIG. 16, the curve 71A represents the spectral characteristics of the first infrared cut filter 71, whereas the curve 72A represents the spectral characteristics of the second infrared cut filter 72. The curve 73A represents the combined spectral characteristics obtained as combined effect of the first and second infrared cut filters of the sixth embodiment.

Embodiment 7

Figure 15:
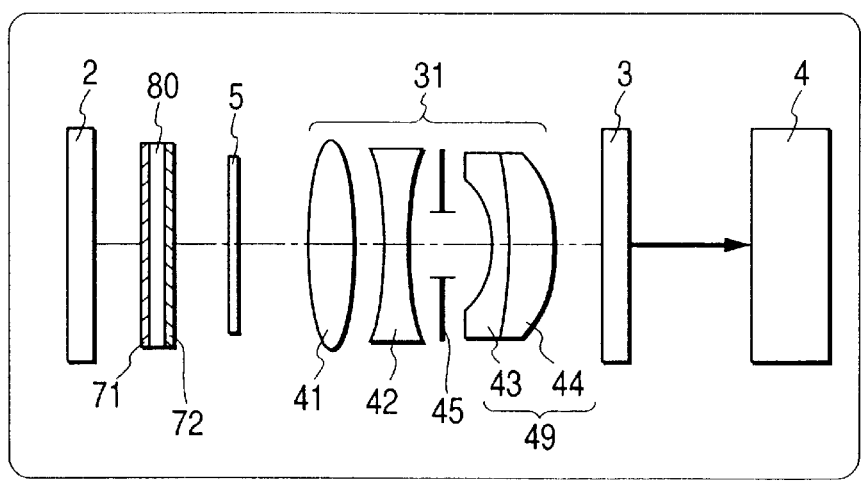
FIG. 15 is a schematic cross sectional view of a principal portion the seventh embodiment of image reading apparatus according to the invention taken along the main scanning direction thereof.
Figure 15:
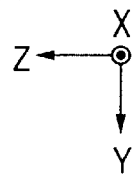

FIG. 15 is a schematic cross sectional view of a principal portion of the seventh embodiment of image reading apparatus according to the invention taken along the main scanning direction thereof. Such an image reading apparatus may typically be used for a film scanner. In FIG. 15, the components same as those of FIG. 13 are denoted respectively by the same reference symbols and would not be described any further.

This embodiment differs from the above described fifth embodiment in that the infrared cut filters of the fifth embodiment formed respectively on the opposite surfaces 42A and 42B of the lens 42 are replaced by the first and second infrared cut filters 71 and 72 showing different spectral characteristics and formed by evaporation respectively on the opposite parallel surfaces of a flat glass panel 80 that is arranged on the optical path between the light source 2 and the original 5. Otherwise, this embodiment is similar to the fifth embodiment in terms of configuration and optical effects so that it operates substantially same as the fifth embodiment. The first and second infrared cut filters 71 and 72 of this embodiment show spectral characteristics same as their counterparts of the sixth embodiment as illustrated in FIG. 16.

Embodiment 8

Figure 17:
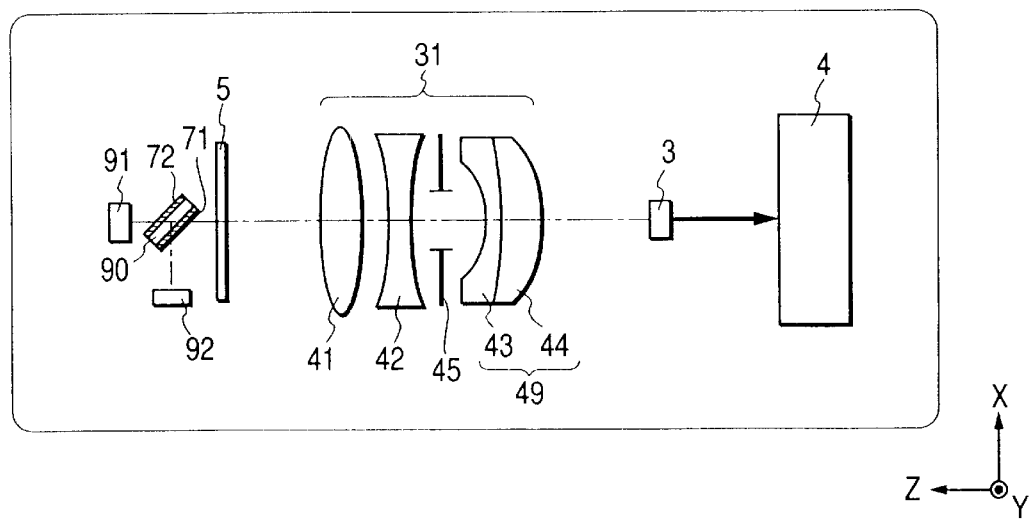
FIG. 17 is a schematic cross sectional view of a principal portion of the eighth embodiment of image reading apparatus according to the invention taken along the main scanning direction thereof.

FIG. 17 is a schematic cross sectional view of a principal portion of the eight embodiment of image reading apparatus according to the invention taken along the sub-scanning direction thereof (that is perpendicular to the direction of arrangement of the light receiving elements of the sensor unit 3). Such an image reading apparatus may typically be used for a film scanner. In FIG. 17, the components same as those of FIG. 15 are denoted respectively by the same reference symbols and would not be described any further.

This embodiment differs from the above described sixth and seventh embodiments in that the single light source of these embodiments is replaced by a pair of light sources 91 and 92 showing spectral characteristics that are different from each other. The light beams emitted from the light sources 91 and 92 are combined to a single light beam by a flat glass panel 90 having parallel surfaces and arranged on the optical path between the light sources and the original 5 to illuminate the original 5.

Figure 18:
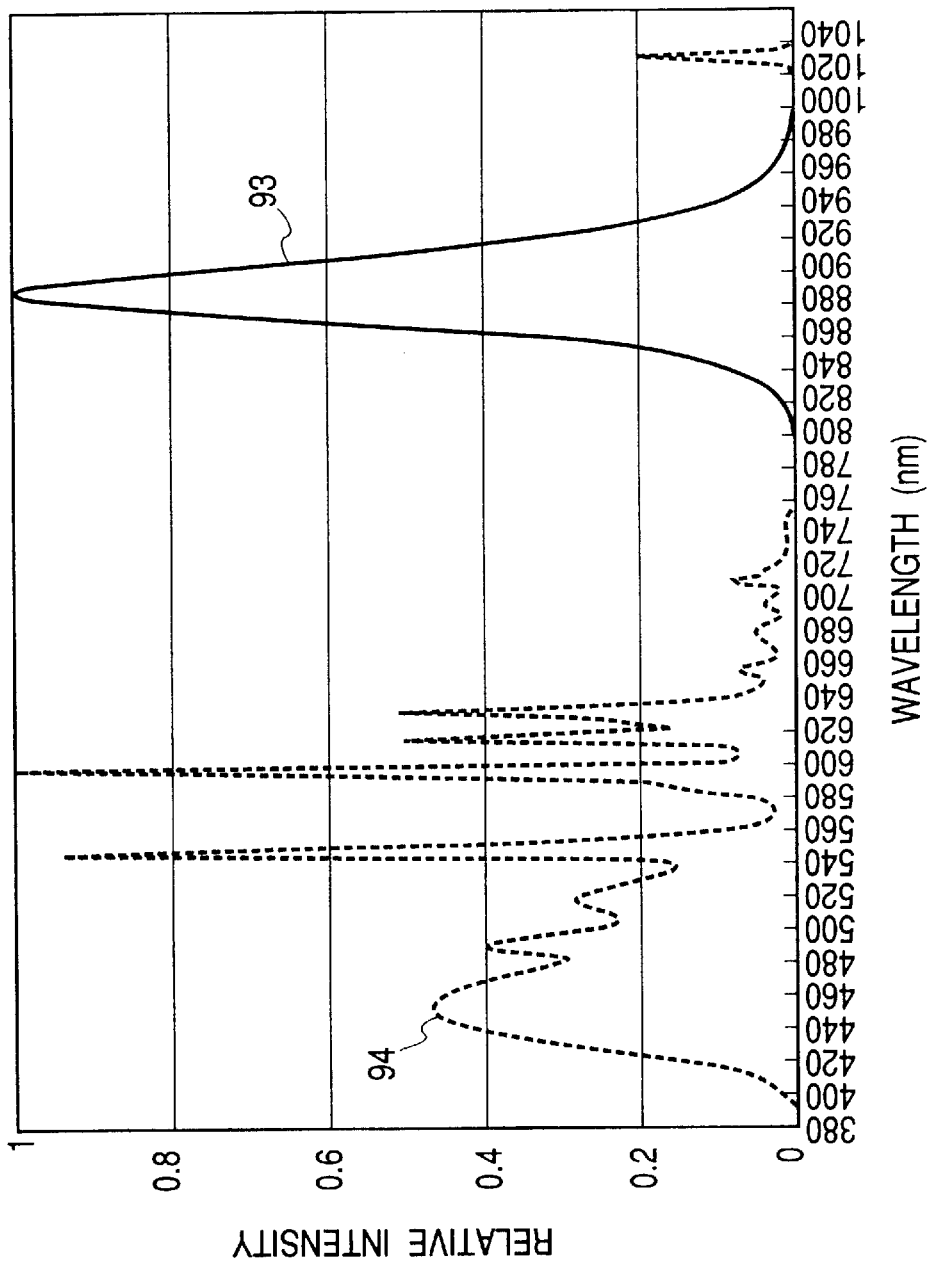
FIG. 18 is a graph showing the spectral characteristics of the light sources of the eighth embodiments.

FIG. 18 is a graph showing the spectral characteristics of the light sources 91 and 92. In FIG. 18, the horizontal axis represents the wavelength and the vertical axis represents the relative intensity of the light beam emitted from the light sources. Referring to FIG. 18, the curve 94 represents the spectral characteristics of the first light source 91, whereas the curve 93 represents the spectral characteristics of the second light source 92.

The infrared cut filters 71 and 72 of this embodiment are formed by evaporation respectively on the opposite surfaces of a flat glass panel 90 and show different spectral characteristics, which are same as those of the sixth and seventh embodiments illustrated in FIG. 16. The light beam emitted from the first light source 91 is transmitted through the flat panel 90 having parallel surfaces and illuminates the original 5. Undesired infrared rays that are cut out by the first and second infrared cut filters 71 and 72 to give rise to an effect similar to those of the sixth and seventh embodiments.

On the other hand, the second light source 92 typically comprises a light emitting diode (LED) showing specific spectral characteristics in an infrared wavelength zone and emitting light with a principal wavelength of 880 nm. The infrared beam emitted from the second light source 92 is reflected by the surface of the flat panel 90 where the first infrared cut filter 71 is arranged to illuminate the original 5. The second light source 92 is used to detect fine particles of dirt and scars on the surface of the original (film) that may be found on the original 5. The technique of detecting particles of dirt and scars by means of infrared rays is known and hence will not be described here any further.

Thus, this embodiment can remove undesired infrared rays with a simple configuration by using infrared cut filters in order to synthetically combine light beams emitted from a plurality of light sources. Thus, this embodiment can produce a high quality image of the original.

This invention can find various applications other than the above described embodiments. For example, while the above embodiments of original reading apparatus are adapted to operate as film scanner for reading a light-transmitting original (film), the present invention may find applications in original reading apparatus adapted to operate as image scanner for reading a light-reflecting original. The configuration of an imaging optical system according to the invention is not limited to those described above by referring to the above embodiments and other combinations of lenses may also be used for the purpose of the invention. Thus, the present invention provides a wide range of applications without departing from the scope of the invention that is defined by the accompanying claims.

What is claimed is:

1. An image reading apparatus comprising:
   a light source for illuminating an original image;
   an imaging optical system for forming an image of the illuminated original image on the focal plane of the system;
   a sensor unit arranged in front of said focal plane;
   an A/D converter for converting the output signal of said sensor unit into an n-bit digital signal; and
   an infrared cut filter unit arranged on the optical path between the light source and the sensor unit, said infrared cut filter having a wavelength zone satisfying the relationship as expressed by the formula below:

$$T \leq 100(2^{**}n),$$

where T is the transmittivity of said infrared cut filter, ** indicates exponentiation, and n is the number of bits of the digital signal, said infrared cut filter unit including at least two infrared cut filters arranged on the optical path between the light source and the sensor unit, said infrared cut filters showing respective spectral characteristics that are different from each other.

2. An image reading apparatus according to claim 1, wherein
   said imaging optical system has a plurality of lenses and said infrared cut filters are arranged on at least two of the respective surfaces of the plurality of lenses.

3. An image reading apparatus according to claim 2, wherein
   said infrared cut filters are arranged respectively on the opposite surfaces of one of said plurality of lenses.

4. An image reading apparatus according to claim 1, further comprising:
   a flat panel having parallel surfaces and arranged on the optical path between said original image and said sensor unit;

said infrared cut filters being arranged respectively on the opposite surfaces of the flat panel.

5. An image reading apparatus according to claim 1, further comprising:

a flat panel having parallel surfaces and arranged on the optical path between said light source and said original image;

said infrared cut filters being arranged respectively on the opposite surfaces of the flat panel.

6. An image reading apparatus according to claim 5, wherein said light source includes a pair of light sources having respective spectral characteristics different from each other;

the light beams emitted from the respective light sources being synthetically combined to form a single light beam by said flat panel having parallel surfaces.

7. An image reading apparatus according to any of claims 1 through 6, wherein each of said infrared cut filters is formed by alternately arranging high refractive index dielectric layers and low refractive index dielectric layers to produce a multilayer structure on a substrate.

8. An image reading apparatus according to claim 7, wherein said high refractive index dielectric layers and said low refractive index dielectric layers have respective thicknesses that are different between the infrared cut filters.

* * * * *